March 9, 1965 E. C. ZOSS 3,172,225
FISHING TACKLE RETRIEVING APPARATUS
Filed Oct. 29, 1962 2 Sheets-Sheet 1
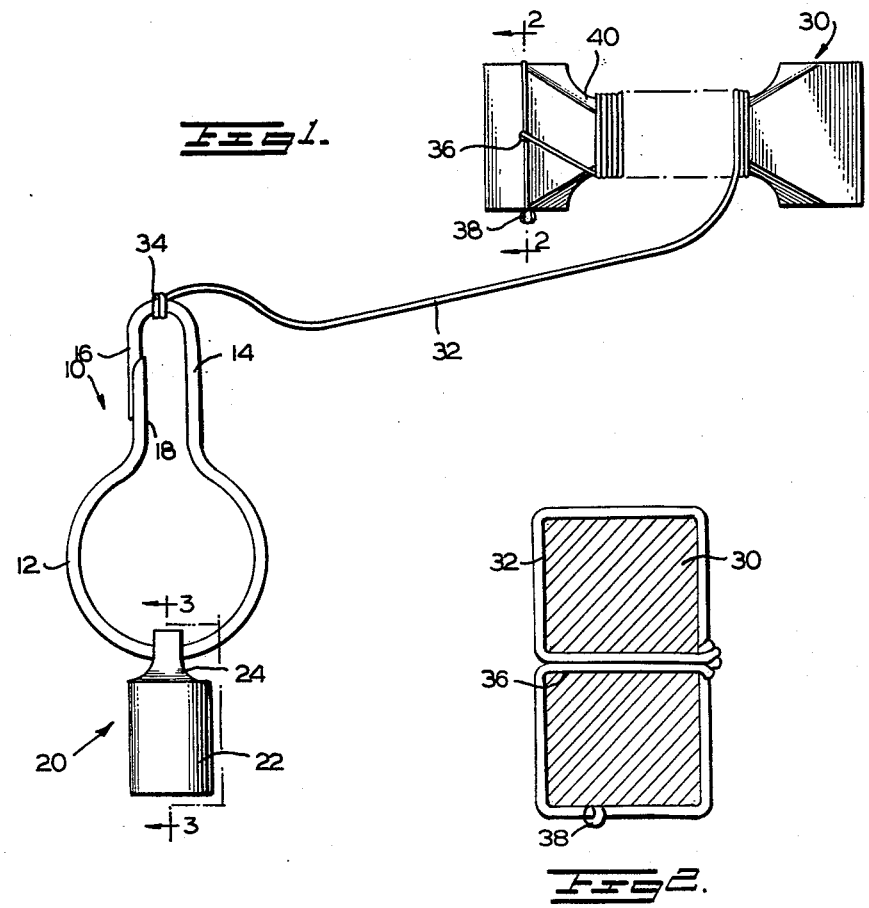
INVENTOR
ELMER C. ZOSS
BY *Stowell & Stowell*
ATTORNEY

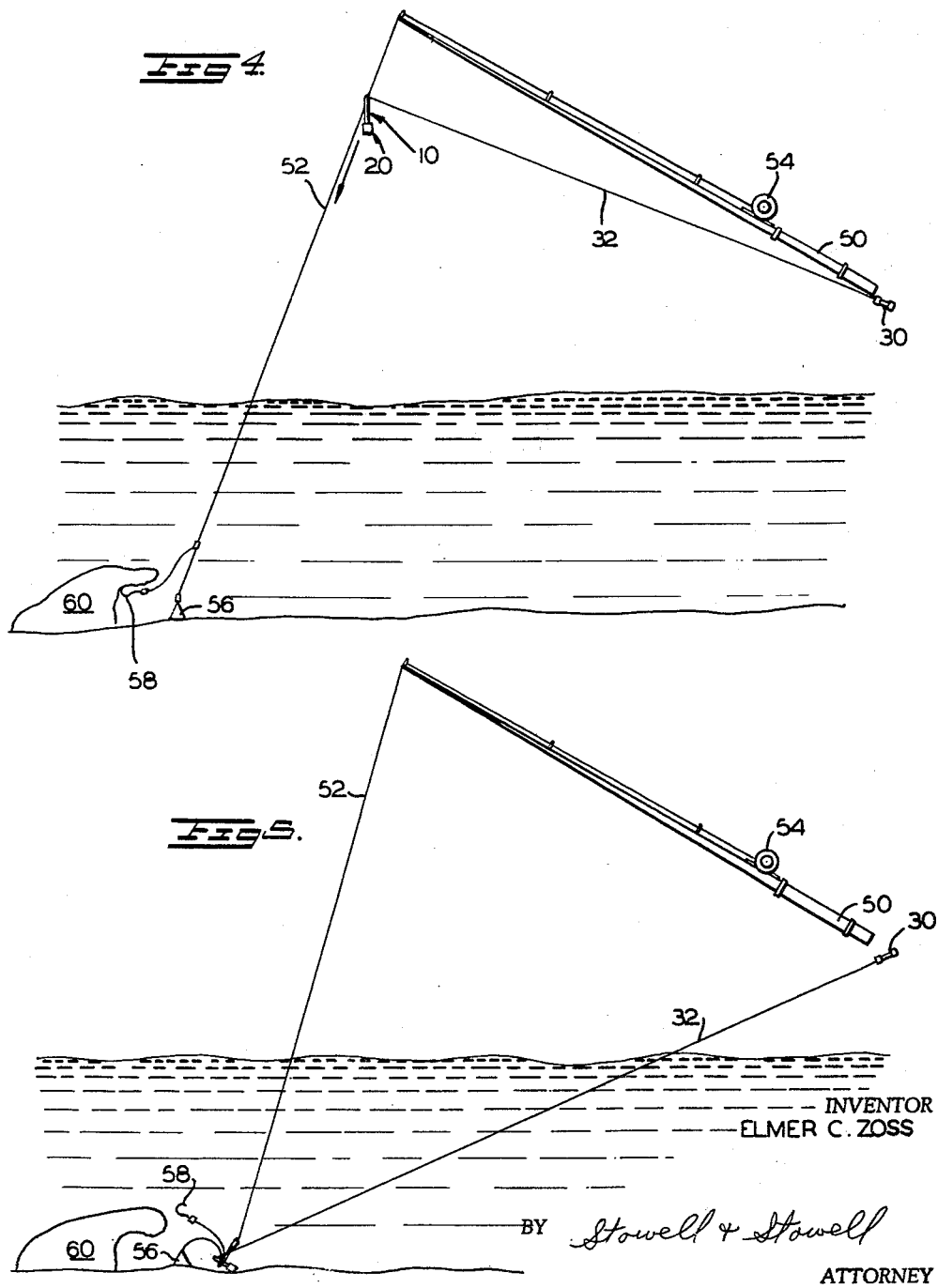

United States Patent Office 3,172,225
Patented Mar. 9, 1965

3,172,225
FISHING TACKLE RETRIEVING APPARATUS
Elmer C. Zoss, 111 Corinthia St., Lockport, N.Y.
Filed Oct. 29, 1962, Ser. No. 233,650
3 Claims. (Cl. 43—17.2)

The present invention relates to a fishing tackle retrieving apparatus.

Oftentimes, fishing hooks become lodged or entangled in rocks or other submerged objects. When the fishing line is pulled or jerked in an attempt to dislodge the hook, the sharp barbed end thereof becomes even more deeply lodged in the submerged object.

Another object of the invention is to produce an apparatus which may be simply and quickly snapped onto a fishing line and cause the effective line attaching point of the fishing hook to be varied, thus enabling the fisherman to thereby effectively dislodge a snagged hook.

The objects of the invention may be achieved by a fishing tackle apparatus which includes a non-buoyant means for encircling a fishing line, and retrieval means secured to the non-buoyant means for retrieving the same.

Other objects and advantages of the invention will become readily apparent from the following detailed description of a preferred embodiment of the apparatus when considered with the accompanying drawings in which FIG. 1 is a view of the fishing tackle retrieving apparatus of the invention;

FIG. 2 is a sectional view of the float and spool taken along line 2—2 of FIG. 1;

FIG. 3 is a sectional view of the weight carried by the fishing line encircling device taken along line 3—3 of FIG. 1;

FIG. 4 is a diagrammatic view of an entangled fishing hook and line wherein the apparatus embodying the novel features of the invention is attached to the line; and FIG. 5 is a diagrammatic view similar to that of FIG. 1 showing the inventive apparatus after the fishing hook has become dislodged thereby.

Referring to FIGS. 1, 2, and 3, there is shown a fishing tackle retrieving apparatus comprising a snap ring 10 having a continuous and uninterrupted annular body portion 12 and an elongate U-shaped neck portion which includes generally parallel leg members 14 and 16. The snap ring 10 is preferably formed of a resilient material such as metal for example and accordingly may be snapped open by squeezing the terminal end 18 of the annular body portion 12 toward the leg 14. In this manner, the snap ring 10 may be caused to encircle a fishing line as will be fully described in connection with FIGS. 4 and 5.

A weight element 20 having a main body portion 22 and a reduced upper portion 24 is suitably pivotally attached to the snap ring 10. It will be noted that the leg member 16 of the U-shaped neck portion is split to provide separable and snappable leg portions to permit the mounting of the weight element 20 on the snap ring 10.

The elongate U-shaped neck portion of the snap ring 10 is secured to a spool 30 by a cord line 32. One end of the cord line 32 is tied as at 34 to the snap ring 10; while the other end is fed through a hole 36 formed in one end of the spool 30 and suitably tied as at 38.

The intermediate portion 40 of the spool 30 may be of a circular cross section to facilitate the winding of the cord 32 when the apparatus is not in use. Also, the spool 30 is preferably formed of a buoyant material such as wood or plastic so that in the event the apparatus were accidentally dropped in the water, the spool 30 would float and could thereby be seen and retrieved.

Now referring to FIGS. 4 and 5, there is illustrated a fishing rod 50 having a fishing line 52 having one end attached to a reel 54. The other end of the fishing line 52 is typically provided with a weight or sinker element 56 and at least one fishing hook 58. In FIG. 4, the hook 58 is shown as being lodged or entangled in a submerged object 60, such as a rock or the like.

In order to dislodge the hook 58, the snap ring 10 is opened and disposed about the fishing line 52. The snap ring 10 will then be caused by the associated weight element 20 to travel down the fishing line 52 in the direction of the arrow in FIG. 4.

The snap ring assembly 10 travels downwardly to a position typically below the point on the line 52 at which the hook 58 is attached. At this bottommost point of travel, the fisherman pulls the spool 30 and the associate cord 32 and dislodges the fishing hook 58 from the submerged object 60. It will be appreciated that the snap ring assembly 10 changes the effective line attaching point and thereby enables the force necessary to dislodge the hook 58 to be applied at a different angle than the force applied through the fishing line 52.

After the fishing hook 58 has been dislodged, the fisherman can readily retrieve the tackle by winding the cord line 32 about the spool 30. When the fishing hook is retrieved by the fisherman, the snap ring 10 is opened to release the fishing line 52 and the hook may be re-baited, if necessary, and returned to the water.

In certain instances in the operation of the apparatus, it has been found that when the weight of the snap ring assembly 10 and the weight element 20 dislodge the fishing hook 58, the fisherman may then reel in the fishing line 52 to retrieve the tackle rather than relying solely on the retrieving of the tackle by reeling in the line 32.

It must be appreciated that an important feature of the invention resides in construction of the apparatus wherein the weight element 20 is free to slide along the circumferential axis of the annular body portion 12 of the snap ring 10 as well as pivot thereabout. The material of which the snap ring assembly 10 is formed is preferably round in cross-section. This construction enables the weight element 20 to constantly seek a lower position with respect to the snap ring assembly 10, thus applying, at all times, a maximum downward force to dislodge the associated fishing hook.

According to the patent statutes, I have explained the principles and mode of operation of my invention, and have illustrated and described what I now consider to represent its best embodiment. However, I desire to have it undestood that, within the scope of the appended claims, the invention may be practiced otherwise than as specifically illustrated and described.

I claim:

1. A fishing tackle retrieving apparatus comprising a snap ring assembly formed of substantially resilient material for encircling a fishing line, said snap ring assembly having an annular portion and an elongate upwardly extending U-shaped neck portion, a non-buoyant weight member pivotally mounted on the annular portion of said snap ring assembly and adapted to pivot freely about and slide along the circumferential axis of the annular portion of said snap ring, one of the legs of the U-shaped neck portion being split to provide separable and snappable leg portions to permit mounting said weight member on said snap ring assembly, and said annular portion being continuous and uninterrupted, and flexible retrieving means secured to the upwardly extending U-shaped neck portion of said snap ring assembly.

2. The invention defined in claim 1 wherein a spool is provided and said retrieving means comprises a flexible line having one end thereof secured to the elongate U- shaped neck portion of said snap ring assembly and the other end is secured to said spool.

3. The invention defined in claim 2 wherein said spool is formed of a buoyant material.

References Cited by the Examiner

UNITED STATES PATENTS

| | | | |
|---|---|---|---|
| 1,044,792 | 11/12 | Levy | 43—17.2 |
| 1,988,160 | 1/35 | Butte | 43—17.2 |
| 2,494,012 | 1/50 | Stricker | 43—17.2 |
| 2,507,495 | 5/50 | Barthel | 43—17.2 |
| 2,562,413 | 7/51 | Carr | 43—17.2 |
| 2,634,539 | 4/53 | Brown et al. | 43—17.2 |
| 2,801,489 | 8/57 | Gehring | 43—17.2 |
| 3,057,110 | 10/62 | Michael | 43—44.97 |

FOREIGN PATENTS

| | | |
|---|---|---|
| 899,445 | 8/44 | France. |
| 945,741 | 12/48 | France. |

SAMUEL KOREN, *Primary Examiner.*